United States Patent [19]
Ladha et al.

[11] Patent Number: 5,517,547
[45] Date of Patent: May 14, 1996

[54] ALARM PANEL WITH CELLULAR TELEPHONE BACKUP

[76] Inventors: Nizar Ladha, 192 Harrison Drive, Newmarket, Ontario, Canada, L3R 4P6; Nazir Dosani, 8 Harris Way, Thornhill, Ontario, Canada, L3T 4T3

[21] Appl. No.: 492,605

[22] Filed: Jun. 20, 1995

Related U.S. Application Data

[63] Continuation of Ser. No. 155,852, Nov. 23, 1993, abandoned.

[30] Foreign Application Priority Data

Apr. 13, 1993 [CA] Canada ................... 2081040

[51] Int. Cl.$^6$ .................................................. H04Q 7/34
[52] U.S. Cl. .............................. 379/40; 379/39; 379/46; 379/59
[58] Field of Search .................... 379/37, 39, 40, 379/42, 46, 50, 58, 59; 455/33.1, 54.1, 67.7

[56] References Cited

U.S. PATENT DOCUMENTS

| | | | |
|---|---|---|---|
| 4,492,820 | 1/1985 | Kennard et al. | 379/46 |
| 4,868,859 | 9/1989 | Sheffer | 379/39 |
| 4,887,290 | 12/1989 | Dop et al. | 379/40 |
| 4,993,059 | 2/1991 | Smith et al. | 379/59 |
| 5,125,021 | 6/1992 | Lebowitz . | |
| 5,131,019 | 7/1992 | Sheffer et al. . | |
| 5,247,564 | 9/1993 | Zicker | 379/39 |

*Primary Examiner*—Curtis Kuntz
*Assistant Examiner*—William G. Trost

[57] ABSTRACT

The present invention provides a simplified system for accommodating an alarm monitoring system to effectively communicate with a remote monitoring station by land lines or by a cellular communication channel. This is accomplished in a manner which reprograms the typical operation of an autotelephone dialer in combination with a particular authorization of a cellular interface. This combination results in a system which is reliable, cost effective, and which can be added to many existing alarm systems, which do not have a cellular capability.

8 Claims, 5 Drawing Sheets

ALARM PANEL WITH CELLULAR TELEPHONE BACKUP

This is a continuation of application Ser. No. 08/155,852, filed Nov. 23, 1993, now abandoned.

FIELD OF THE INVENTION

This invention relates to alarm panels and in particular to alarm panels which communicate an alarm or other signals to a remote monitoring service or station. In particular, the invention relates to an alarm panel which is capable of communicating signals either via traditional land telephone lines or via a cellular telephone arrangement. The invention is also directed to a simple arrangement for carrying this out.

BACKGROUND OF THE INVENTION

There are many alarm systems which monitor a number of sensors and produce an alarm signal based on the status of the sensors. Most of these systems have an on-site alarm, such as a siren or horn, and most of these systems also have the capability of transmitting such an alarm signal to a remote monitoring station which can investigate the alarm condition. From time to time, even without an alarm to be reported, some such systems may be programmed to initiate communication with the remote monitoring system. Communication of an alarm condition or otherwise is typically carried out using autotelephone dialing technology which places an outgoing call over land-based telephone lines to the remote monitoring station. Other arrangements include the use of a cellular backup system which is activated if the land lines are disrupted For example, in many house break-ins, it is common for the burglars to cut the telephone lines prior to entering, such that the conventional alarm system is isolated. There have been many proposals for allowing modification of conventional existing alarm systems to also communicate via a cellular channel. These systems often require conversion of telephone number data from a digital form stored in the initial alarm panel to an analog form for transmission in what would have been the typical manner via land based telephone lines back to a digital format when it is required to be transmitted via the cellular network. The protocol for cellular communication is different and more complicated than the protocol used for communication over land lines and this complicates how the systems can be effectively combined.

In addition, there has been development with respect to the logic for determining when the land lines have been cut as opposed to merely problems obtaining a clear line.

The prior art systems which have cellular backup typically use existing cellular interface technology, such as interfaces described in U.S. Pat. Nos. 4,737,975, 4,922,517, 4,775,997 and 4,658,096, all in the name of Metrofone, Inc. According to these well known systems, the cellular interface provides a line appearance to the telephone device to which it is connected (i.e. the existing alarm) and provides a keyboard appearance to the cellular transceiver. More particularly, the cellular interface includes means for converting and storing touch-tone or pulse dialed digits into digital data. After all of the digits have been dialed, the interface generates a SEND code signal to the transceiver. In response to receiving the SEND code signal, the transceiver transmits the digital data over the cellular network. When the telephone call is completed, the cellular interface generates and sends an END signal to the transceiver for terminating the call.

The prior art typically places a relay to reroute the output of the autotelephone dialer to the cellular interface which requires conversion of at least the analog signal of the telephone address of the remote monitoring station to digital format acceptable to the cellular interface.

One approach for solving this problem is disclosed in U.S. Pat. No. 5,131,019 where a certain portion of the signal, typically produced by the alarm panel, is inhibited when the cellular backup phase is operated. This is a fairly complicated arrangement, although it does provide an alternate arrangement for allowing the cellular backup capability.

A further arrangement is disclosed in Smith U.S. Pat. No. 4,993,059 where a separate cellular channel for communicating the alarm signal to the remote monitoring station is not provided. In this case, the cellular system produces a hot line, which is merely a communication between the cellular device at the alarm panel and a cellular receiving station. The cellular receiving station, when it does receive this signal, has logic for communicating the information to the monitoring service. This arrangement was proposed to simplify the cooperation of the alarm transmission to the remote monitoring service, however, it does not provide the advantages of being capable of using the cellular channel for other purposes, including instructing of the alarm panel, should the land lines be inoperative.

There remains a need to provide a simple, reliable, cost effective manner for providing a cellular backup system to an alarm panel which would normally communicate the alarm signal via land lines to a remote monitoring station.

SUMMARY OF THE INVENTION

According to the present invention, it is possible to modify the traditional function of the alarm panel including the microprocessor to, in effect, only use a portion of what would be the normal protocol for completing a land line communication with a remote monitoring service as part of the steps for completing the cellular channel. This cellular channel to the remote monitoring service is only used when an initial failure has occurred or when it has been predecided that the cellular channel should be used. In existing alarm systems having an alarm panel and a microprocessor which uses land lines to communicate the alarm signal, a separate add-on arrangement can be provided which has its own microprocessor, which, in effect, controls the system to establish the cellular communication channel and then returns control to a microprocessor provided in the normal alarm panel. In this way, the hardware and software for effectively communicating the alarm signal and other information from the microprocessor of the alarm panel to the remote monitoring service is carried out in its normal function and the add-on components are focused to merely provide the alternate communication channel.

The present invention, according to a preferred aspect, is found in the combination of an alarm system and cellular communication system which cooperate in a particular manner. The alarm system comprises a number of sensors connected to a microprocessor which receives and evaluates the signals from the sensors and produces an alarm signal, when required, based on the status of the sensors. A telephone communication arrangement is associated with the microprocessor and establishes a land line telephone communication channel with the remote monitoring station when an alarm is produced or when the alarm system must otherwise communicate with the remote monitoring station. The microprocessor cooperates with the telephone system to, upon demand, cause the telephone communication arrangement to go off-hook and look for the telephone system-generated dial tone. If the dial tone is not detected, then the microprocessor causes the telephone communication arrangement to be placed in a cellular stand-by condition by going off-hook and await the receipt of the known acknowledgement signal from the remote monitoring system. The cellular communication cooperates with the microprocessor to cause the cellular communication system to complete a cellular communication channel between the microprocessor and the remote monitoring station upon failure of the telephone arrangement to establish a land line telephone communication channel with the remote monitoring station. The cellular communication system and microprocessor cooperate to establish the cellular communication channel by a) digitally transferring the telephone address of the remote monitoring station directly to the cellular system; b) separate the telephone communication system from the land lines; c) cause said telephone communication system to be placed in the cellular stand-by condition; and d) connecting the microprocessor via the telephone communication system to the cellular system and await receipt of the acknowledgement signal from the remote monitoring system transmitted via the cellular communication channel. The cellular communication channel, upon receipt of the telephone address, forms the cellular communication channel in the conventional way, as if the telephone address had been inputted into the cellular communication channel. It is also possible to have the cellular communication system merely maintain the telephone address, and in this case, the cellular communication system would merely await an authorization signal from the microprocessor of the alarm panel.

The present invention can also be realized by utilizing a cellular add-on arrangement with an alarm panel which was initially designed to contact a remote monitoring station via land lines alone. According to an aspect of the invention, a cellular add-on arrangement for cooperating with an alarm monitoring system which communicates with a remote monitoring station by using the telephone address thereof and land based telephone lines is disclosed. The cellular add-on arrangement comprises a microprocessor for controlling the operation of the cellular arrangement and a relay arrangement making a selective connection of a first communication signal with either land based telephone lines or a cellular communication capability. The relay arrangement makes the selective connection based upon a control signal originating with the microprocessor and transmitted to the relay arrangement. The microprocessor also includes input means for receiving a digital initiation signal used to cause formation of a cellular communication channel with the remote monitoring station identified by a telephone address included in the initiation signal. The microprocessor, upon receipt of the initiation signal, uses the telephone address to form a cellular communication channel with the remote monitoring station and to also cause the relay arrangement to disconnect the first communication signal from the land lines and connect the first communication signal with the cellular communication channel established with the remote monitoring station. In this way, communication with the remote monitoring station may be established by using standard land lines or by using a cellular capability.

A modified alarm panel, according to the present invention, comprises a microprocessor, a plurality of sensors which are monitored by the microprocessor, and a memory associated with the microprocessor for digitally retaining a telephone address of a remote monitoring station. The microprocessor produces an alarm signal based on the status of the sensors which alarm signal is forwarded to a remote monitoring station by using the telephone address to complete a land line based telephone communication between the microprocessor and the remote monitoring station. The microprocessor also includes a digital output signal capability by means of which a digital signal is outputted when the microprocessor has determined a land line based telephone communication with the remote monitoring station is not possible or preferred. The digital signal includes the telephone address of the remote monitoring station whereby an alternate method of communicating with the remote monitoring station is achieved by connecting the digital signal to a suitable device which extracts the telephone address provided in the digital signal and uses the same to complete an alternate method of communicating with the remote monitoring station.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
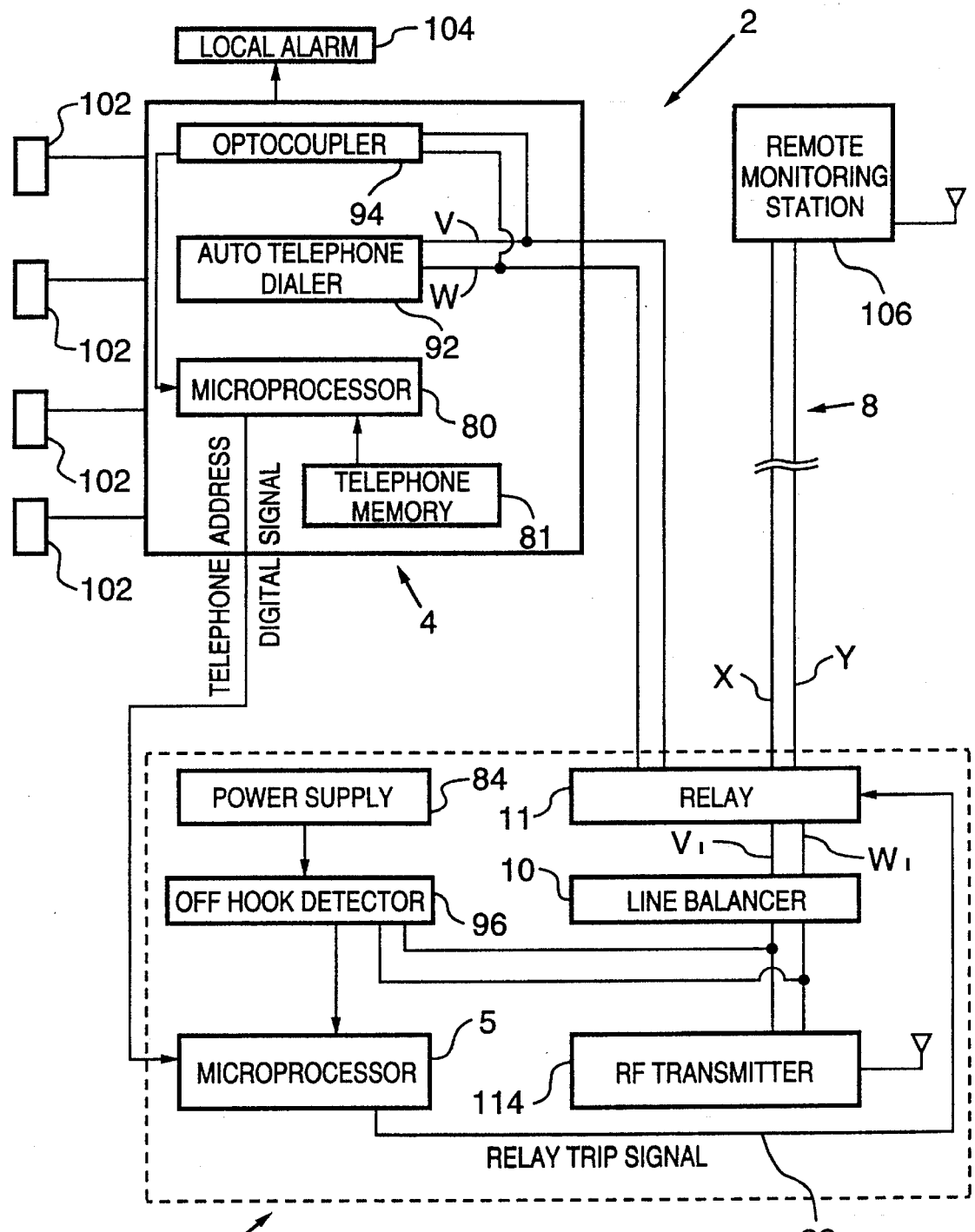
FIG. 1 is a schematic of the alarm system with cellular backup.

An overview of the system can be appreciated from FIG. 1 where the combination system is generally shown as 2. The alarm system includes an alarm panel 4 which receives the output or monitors the status of the various sensors, generally shown as 102. The microprocessor 80 monitors the output of the alarm devices 102, and based on the status of the devices, produces an alarm signal. This alarm signal may activate an optional local alarm 104 and is transmitted via the publicly switched telephone network, indicated as 8, to the remote monitoring station 106. This transmission is over what is referred to as "land lines". This communication to the remote monitoring station 106 is accomplished by the microprocessor 80 communicating with the autotelephone dialer 92 which uses a telephone number recorded in memory 81, which is the telephone address of the remote monitoring station. A convention dial tone monitoring device 94, such as may include a conventional opto-coupler, monitors for dial tone in the land lines. Microprocessor 80 monitors the output of dial tone monitoring device 94 and takes further action, depending on whether a dial tone is or is not present. If dial tone is present, microprocessor 80 simply causes autotelephone dialer 92 to dial and alarm panel 4 to communicate with station 106 over the land lines in a convention fashion. If dial tone is not present, microprocessor 80 causes a digital signal, incorporating the digital telephone address stored in memory 81 (i.e. the telephone number of the remote station 106) to be shipped to cellular processing arrangement 20.

A relay or switching arrangement 11 is provided on the land lines and serves to either connect the alarm panel 4 to the land lines or disconnect it from these land lines. In the normal operating condition, the land lines are connected. A cellular processing arrangement, generally shown as 20, is used to form a cellular transmission channel between the remote monitoring station 106 and the alarm panel 4. The relay 11, in one mode, operates to connect the alarm panel 4 to the land lines shown as X and Y, and in a different mode, serves to connect the alarm panel with the cellular arrangement 20 and thereby disconnect the alarm panel from the land lines. The relay switches between the land line mode and the cellular mode as a function of a control signal originating with the microprocessor 5 which is transmitted on line 22. When the control signal is present, the alarm panel 4 communicates through autotelephone dialer 92 to the cellular arrangement 20. The cellular arrangement 20 includes a microprocessor 5 which directly receives a digital signal from the microprocessor 80 of the alarm panel 4. This signal includes the digital telephone address of the remote monitoring station stored in memory 81 of the alarm panel 4 and its delivery serves as authorization for the microprocessor 5 to effect a cellular communication channel with the remote monitoring station 106. The microprocessor 5 actuates relay 11, while at the same time, the microprocessor 80 causes the automatic telephone dialer to go to an off-hook condition forming a cellular stand-by condition. In this condition, the automatic telephone dialer and conventional monitoring circuitry (not shown) waits for the traditional acknowledgement signal which will be sent by the remote monitoring station 106 when contacted by the alarm panel 4. In this case, this acknowledgement signal will be communicated over the cellular communication channel. The microprocessor 5 accepts the digital telephone address, and after confirming through off-hook detector 96 that the automatic telephone dialer 92 has gone off-hook (i.e. it is in cellular stand-by condition), attempts to make a communication via a cellular channel according to conventional cellular protocol. Briefly, as is well known, this involves making an initial cellular transmission to a cellular relay station via the cellular RF transceiver 114, with this initial transmission including the telephone address of the remote monitoring system as well as the usual identification information for the station initiating the call. The relaying station then preferably uses land lines to complete the communication channel with the remote monitoring station 106. Once this communication channel has been formed, the remote monitoring station can then send the acknowledgement signal through the channel, which is received by the RF transceiver 114 and passed through the line balancer 10, through the relay 11, to the alarm panel 4. If the alarm panel 4 detects the presence of the acknowledgement signal within a predetermined time, say 40 seconds, of initially entering cellular stand-by condition, then microprocessor 80 will cause the alarm or other relevant data to be transmitted in conventional fashion through autotelephone dialer 92 and the cellular channel to station 106. If not, then microprocessor 80 simply initializes alarm panel 4 (microprocessor 5 will also initialize cellular arrangement 20 and reset relay 11) and the entire sequence will start over and will repeat a number of times until a communication channel is established either over the land lines or the cellular network. After approximately eight attempts, the unit forwards the signal to a buffer and returns to its monitoring function. The buffered signal can be communicated at a later time when communication is made with the remote monitoring station. For example, if a further alarm condition was sensed, both signals could be communicated to the remote monitoring station.

Therefore, in the above manner, the alarm panel 4 can communicate to the remote monitoring station by either direct land lines or via the cellular communication channel. The cellular arrangement 20 serves to form the channel and then returns control to the microprocessor 80 of the alarm panel 4.

From the above, it can be appreciated that a combination alarm panel can be produced which includes the function of the alarm panel 4 as well as the control logic performed by microprocessor 5. For the sake of clarity, it has been described with respect to the ability to form the cellular communication channel and return control to an existing alarm panel. It is readily apparent that this could be combined in a single system having a common microprocessor. The embodiment described illustrates how an existing system can be converted with minor reprogramming of the microprocessor 80 and reprogramming of a microprocessor associated with the cellular capability.

The cellular arrangement 20 includes its own off-hook detector 96 which also serves to electrically isolate the microprocessor 5 from the equivalent telephone lines indicated as $V_1$, $W_1$ connected to the relay 11. This isolation is accomplished by an opto-isolator shown in FIG. 2C. The line balancer 10 serves to isolate, in generally typical fashion, the transceiver 114 from the relay 11 and the alarm panel 4.

FIG. 1 also shows that the remote monitoring station could include its own cellular channel, however, typically this would be a land line communication from the cellular relaying station to the remote monitoring station.

Figure 2A:
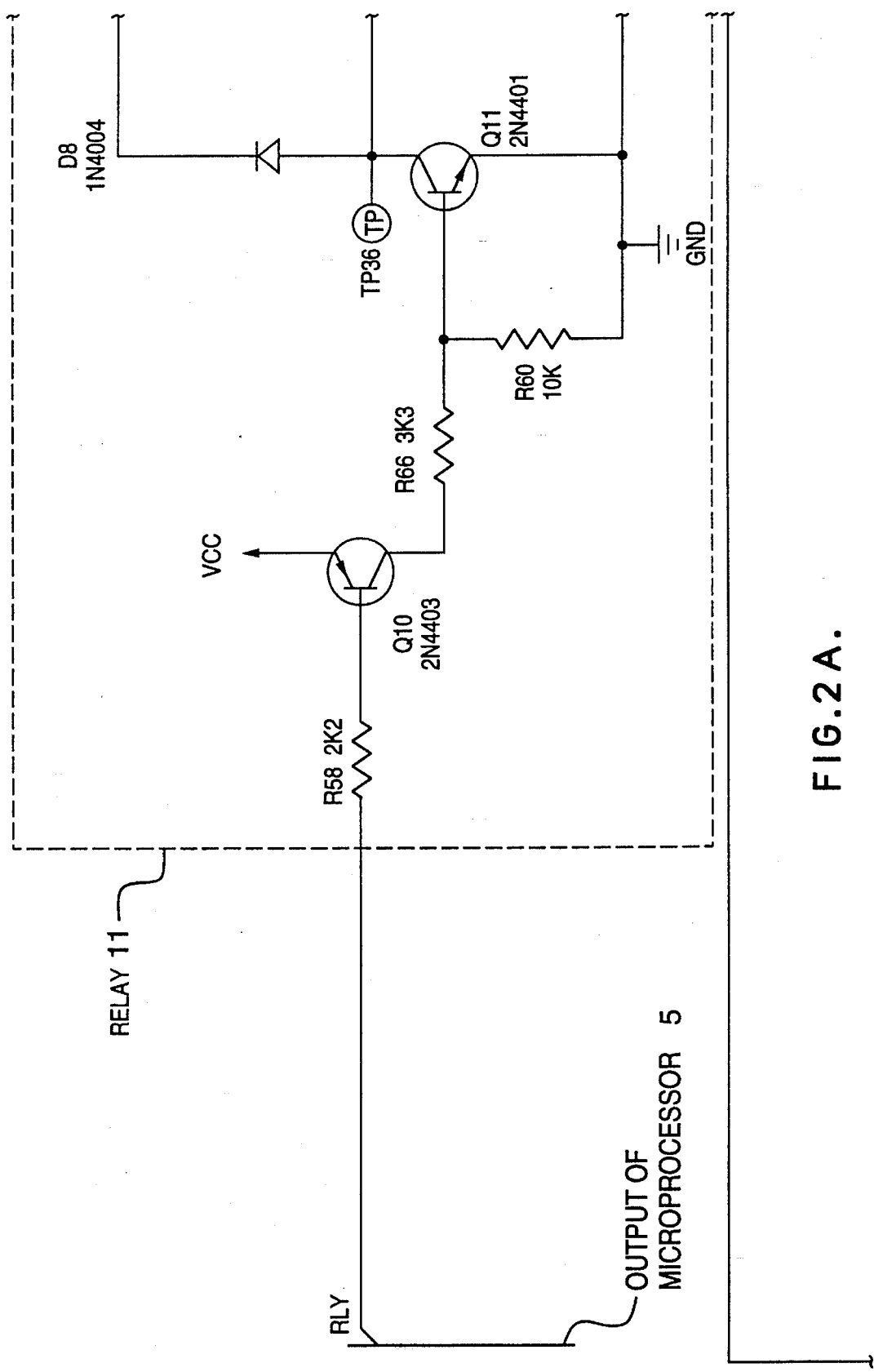
FIGS. 2A, 2B, 2C and 2D collectively illustrate a more detailed circuit drawing of various components of the overall system.
Figure 2B:
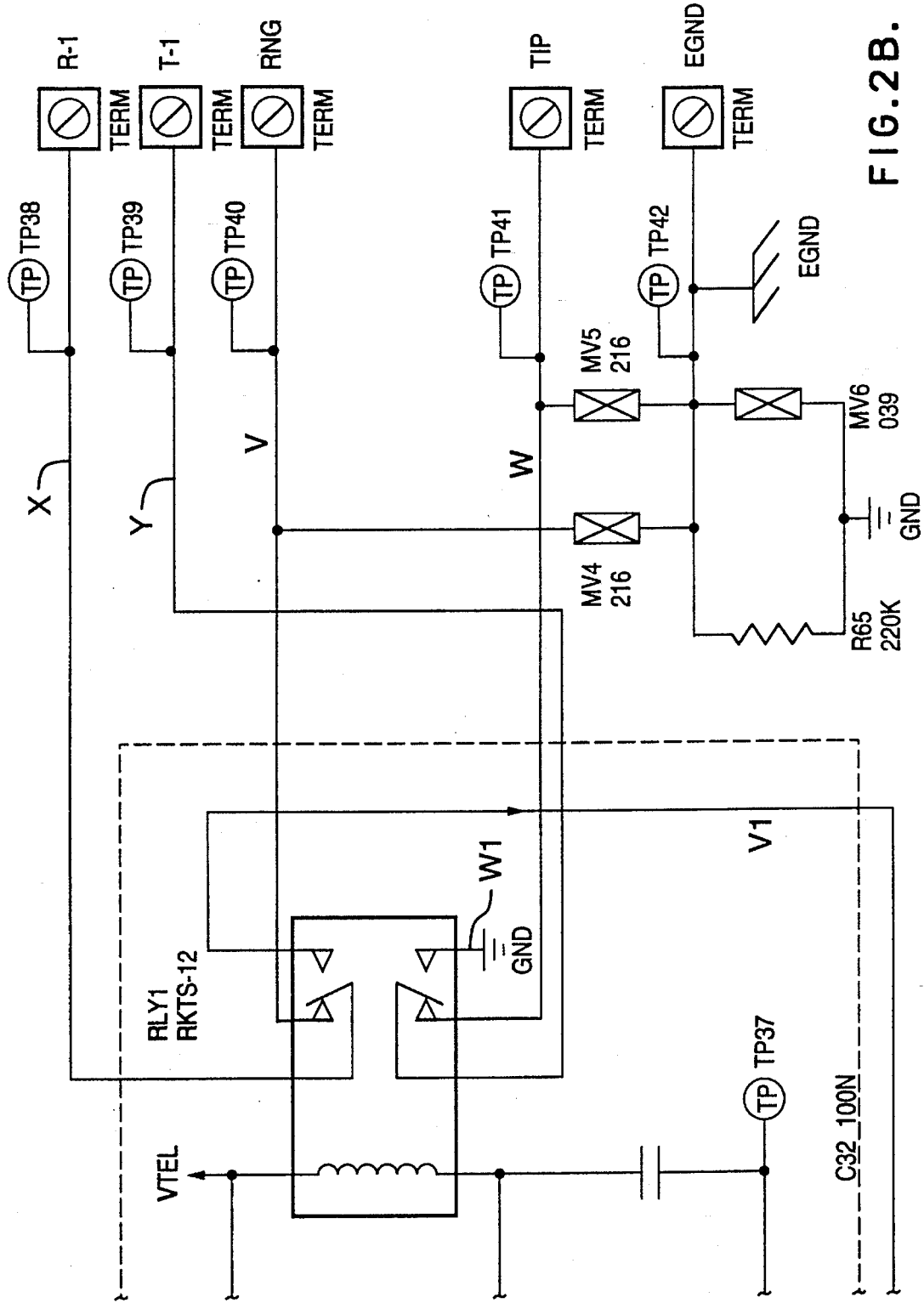
Figure 2C:
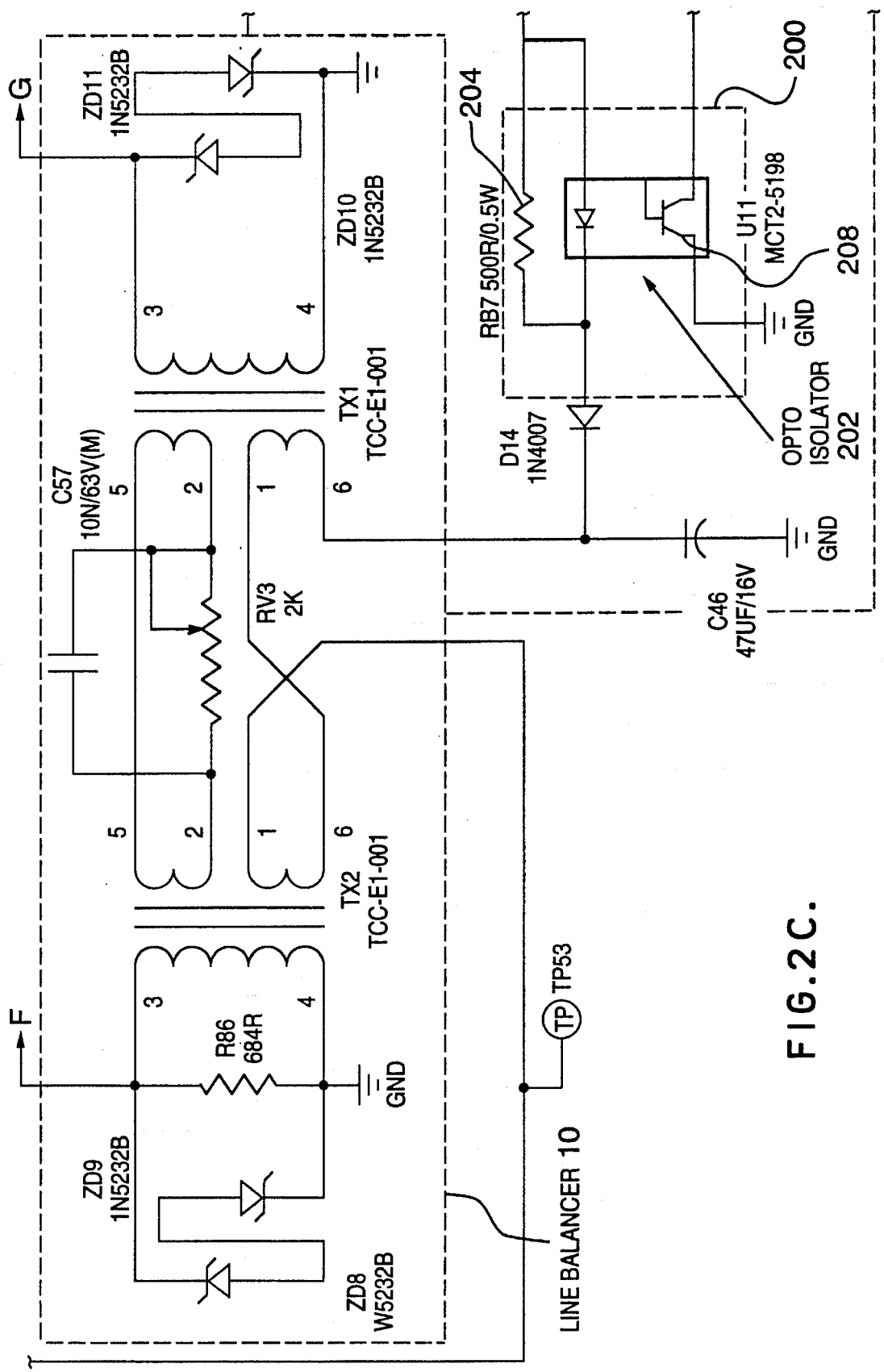
Figure 2D:
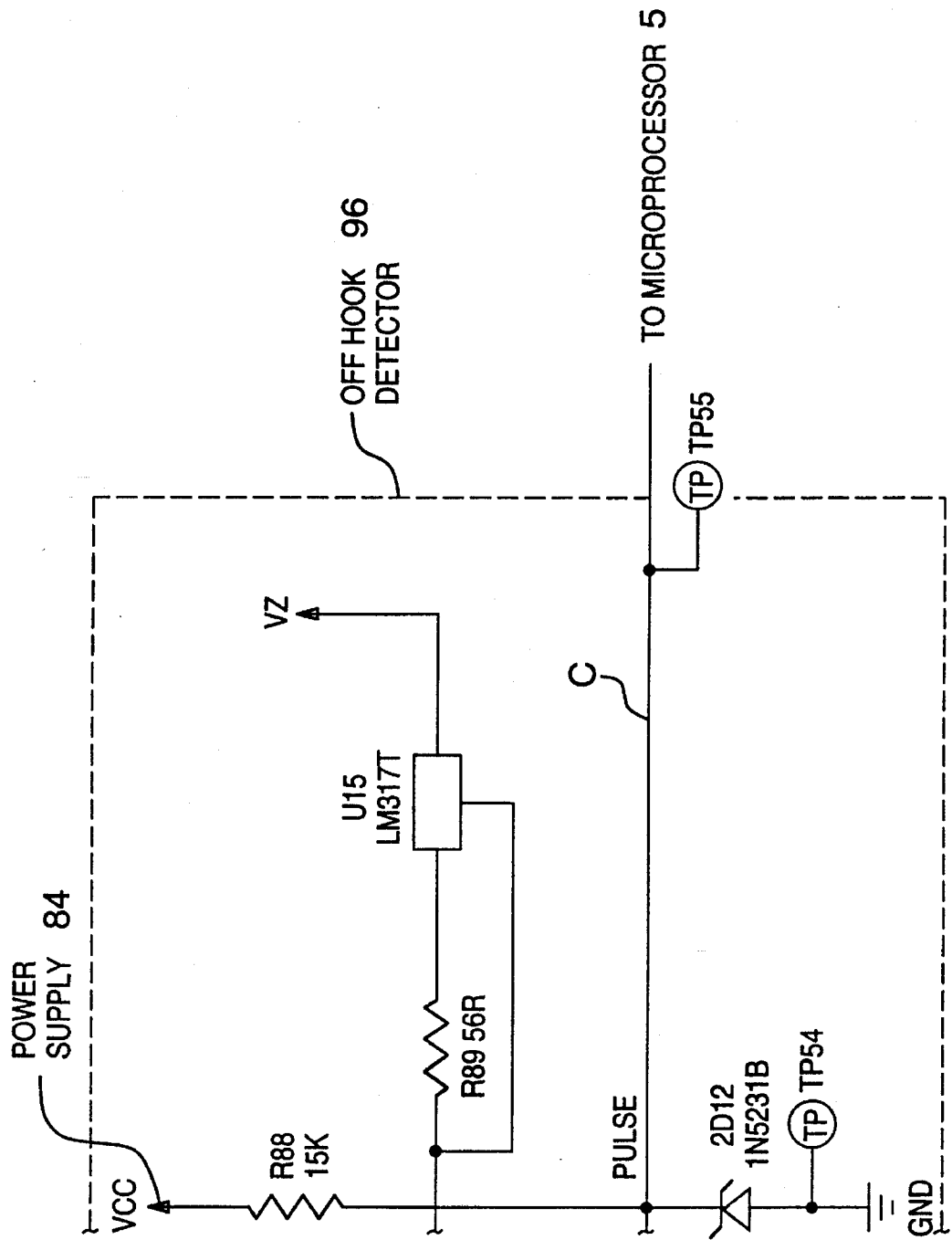

Further details of the circuitry of the relay 11, line balancer 10 and off-hook detector 96 are shown in FIG. 2C. Off-hook detector 96 comprises a current sensing device which converts the current signal in line $V_1$ to low/high logic signals in line C. As shown, line $W_1$ has been grounded. In particular, the preferred current sensing element 200 incorporates a conventional opto-isolator device 202. The changes in current in line $V_1$ cause a related voltage change across a resistor 204 in opto-isolator device 200. In turn, this causes an LED 206 in opto-isolator 202 to turn on and off. The light from the LED then controls the operation of a light-sensitive semi-conductor switch device 208 in opto-isolator 202. In turn, this causes low voltage in line C, corresponding to current signals in line $V_1$. Thus, the LED switches with the changes in current. Microprocessor 5 monitors and times the changes in the condition of the output of opto-isolator device 200. According to telephone company standards, a determination can be made by microprocessor 5 that autotelephone dialer 92 is either on-hook or off-hook.

In one optional embodiment cellular device 20 could be adapted to receive incoming telephone data (e.g. data to reprogram components of alarm panel 4 or even voice signals to and from the central monitoring station 106 passed through alarm panel 4 to a microphone/loudspeaker system in order to assist in verification of the presence of an intruder). Such incoming data made during a telephone call initiated by alarm panel 4 is simply routed into lines $V_1$, $W_1$ through a transceiver 114, which includes an audio processor, all in conventional fashion.

If the central monitoring station 106 wishes to initiate a telephone communication with alarm panel 4, the RF transceiver 114 and microprocessor 5 will be connected so as to generate a conventional alert signal in a line A (not shown) from cellular device 20 back to panel 4 to indicate an incoming call. This signal is delivered to microprocessor 80, which will have been pre-programmed to activate certain functions in response to receipt of such an alert signal.

As a further option, it is possible to have a mode select switch built-in to alarm panel 4 connected through another line B (not shown) to cellular telephone arrangement 20. Such mode switch may be used to send a signal to microprocessor 5 that the system is to be operated either in land line/cellular combination mode as described above or in cellular-only mode.

An optional manual select switch (not shown) at alarm panel 4 may allow a manual selection to be made between pulse or touch tone (i.e. DTMF) dialing for the dialing priorities over the land lines of autotelephone dialer 92.

The present invention has been described with respect to a conventional cellular network having voice and data transmission capability, however, it can be used with a data cellular network. For example, the invention can include an RF modem for effectively coupling with the MOBTEX network.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In combination an alarm panel and a cellular transceiver arrangement, said alarm panel comprising an alarm panel microprocessor which receives status signals from a plurality of sensors and based on said received signals produces an alarm signal upon an alarm condition detected by said sensors and communicates said alarm signal in combination with an identification signal to a remote monitoring station using a public telephone system, said alarm panel including a telephone communication arrangement controlled by said alarm panel microprocessor for communicating with said remote monitoring station, said telephone communication arrangement including an autodialer controlled by said alarm panel microprocessor to operate in a normal mode to initiate a land line based telephone communication with said remote monitoring station or controlled to operate in a cellular mode by initially going to an off-hook condition and awaiting an acknowledgement from the remote monitoring station, said alarm panel microprocessor including logic means for switching to the cellular mode upon a predetermined delay in establishing a land line based telephone communication with said remote monitoring station and causing said alarm panel microprocessor to produce a microprocessor output signal, said cellular transceiver arrangement including a microprocessor controlled switch means which in a normal mode causes said autodialer to be connected to land based telephone lines and in a cellular mode causes said autodialer to be connected to a cellular transceiver of said cellular transceiver arrangement, said cellular transceiver arrangement including a communication microprocessor connected to said alarm panel microprocessor to receive said microprocessor output signal, said communication microprocessor being connected to and controlling said switch means and causing said switch means to assume the cellular mode upon receipt of said microprocessor output signal with said autodialer of the alarm panel in an off-hook condition awaiting an acknowledgement signal and connected to said cellular transceiver; said communication microprocessor upon receiving said microprocessor output signal causing said cellular transceiver to initiate a cellular communication channel with the remote monitoring station connected to said autodialer by said switch means, said alarm panel transmitting said alarm signal to said remote monitoring station using said cellular communication channel after an acknowledgement signal is received from said remote monitoring station and recognized by said alarm panel microprocessor.

2. In combination as claimed in claim 1 wherein said alarm panel microprocessor includes the telephone address of the remote monitoring station and said telephone address forms part of said microprocessor output signal, and wherein said communication microprocessor receives and uses said telephone address in forming said cellular communication channel.

3. In combination as claimed in claim 1 wherein said alarm panel and said cellular transceiver are separately contained, said alarm panel including telephone communication ports connected to input ports of said switch means, and said switch means has output ports connected to said telephone lines and all telephone communications of said alarm panel are via said switch means.

4. In combination as claimed in claim 3 wherein said alarm panel includes memory means for storing and maintaining said telephone address.

5. In combination as claimed in claim 1 wherein said cellular transceiver arrangement completes all steps for forming said cellular communication channel, and said alarm panel outputs said alarm signal using said autodialer for normal mode and cellular mode.

6. In combination as claimed in claim 1 wherein said alarm panel microprocessor and said communication microprocessor, in the event of failure to establish a cellular communication channel, cooperate and return control to said alarm panel microprocessor which repeats the sequence of initially establishing a land line telephone communication and if unsuccessful, attempts to form a cellular communication channel.

7. In combination as claimed in claim 2 including means for repeating the steps of initially attempting to form the land line communication channel followed by attempting to form the cellular communication channel.

8. In combination as claimed in claim 7 including means for discontinuing attempting to form either of said communication channels after a predetermined number of failed attempts and storing said alarm signal in a memory device for recall when said alarm panel is in communication with the remote monitoring station.

\* \* \* \* \*